United States Patent [19]

Gelbien

[11] Patent Number: 5,135,441

[45] Date of Patent: Aug. 4, 1992

[54] SHIFTING APPARATUS FOR MULTISPEED BICYCLES

[76] Inventor: Mark Gelbien, 24 Gun La., Levittown, N.Y. 11756

[21] Appl. No.: 705,504

[22] Filed: May 24, 1991

[51] Int. Cl.⁵ .............................................. F16H 11/08
[52] U.S. Cl. ......................................... 474/78; 474/80
[58] Field of Search ................................... 474/77-81

[56] References Cited

U.S. PATENT DOCUMENTS

| | | | |
|---|---|---|---|
| 4,887,990 | 12/1989 | Bonnard et al. | 474/78 |
| 4,900,291 | 2/1990 | Patterson | 474/80 |
| 5,033,991 | 7/1991 | McLaren | 474/78 |

*Primary Examiner*—Thuy M. Bui
*Attorney, Agent, or Firm*—Bauer & Schaffer

[57] ABSTRACT

A low effort shifter for multispeed bicycles and the like having cable operated derailleurs is provided, comprising a circular spool rotatably mounted in a housing. The derailleur control cable is operatively anchored to the spool so that when the spool is rotated, the derailleur changes position. A force cancellation spring is anchored to the spool so as to counteract and oppose the moment imposed upon the spool by the derailleur bias spring. The force cancellation spring is routed in a circular path around said spool and extends to a linear path into a straight portion of the housing, where the spring is coupled to a preload adjustment screw. The spool has a gear thereon which is engaged with a second gear, the second gean being coupled to a shift knob outside the housing. The shift knob may be selectively operated by the rider using substantially negligible force to effectuate drive ratio changes.

8 Claims, 3 Drawing Sheets

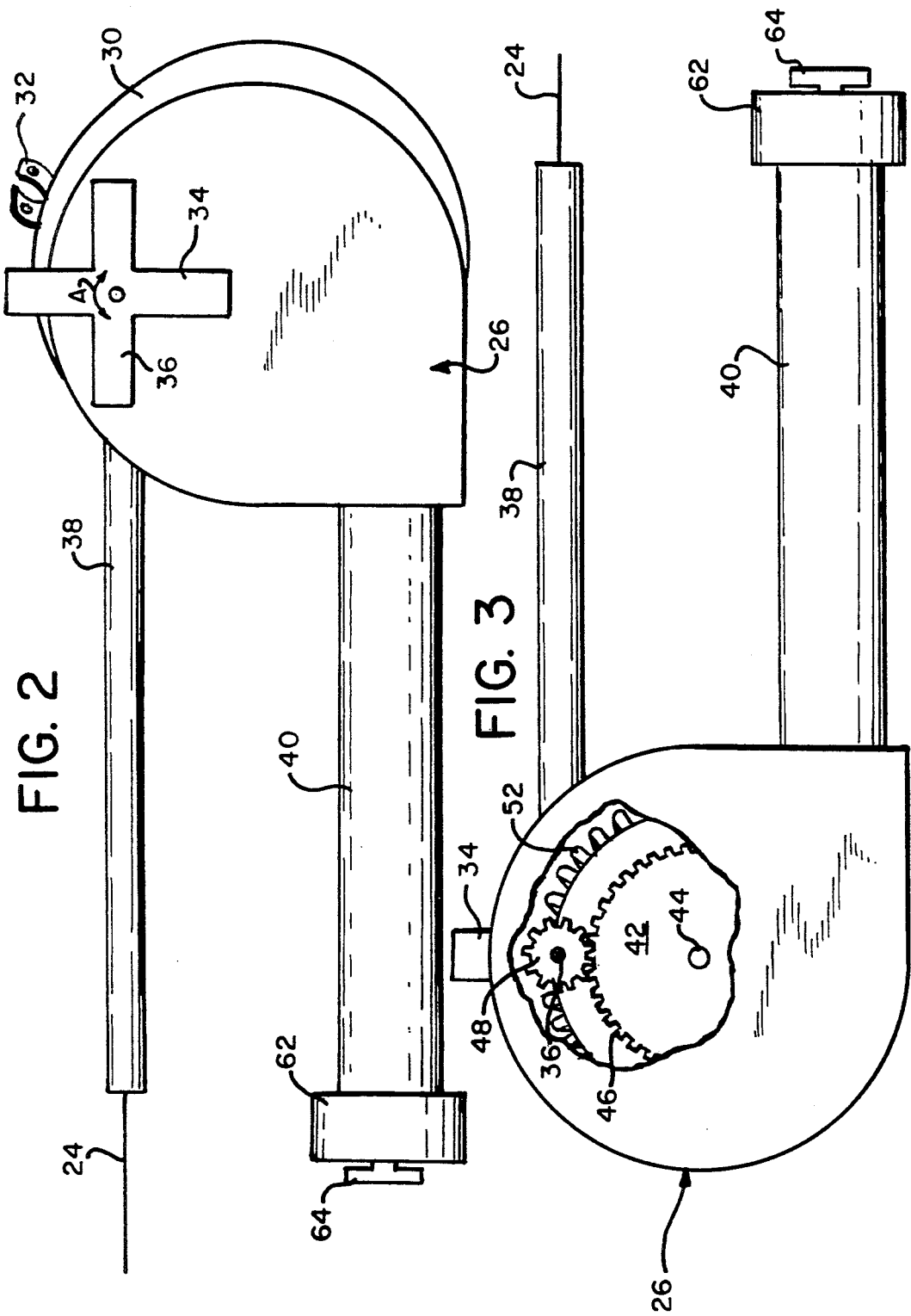

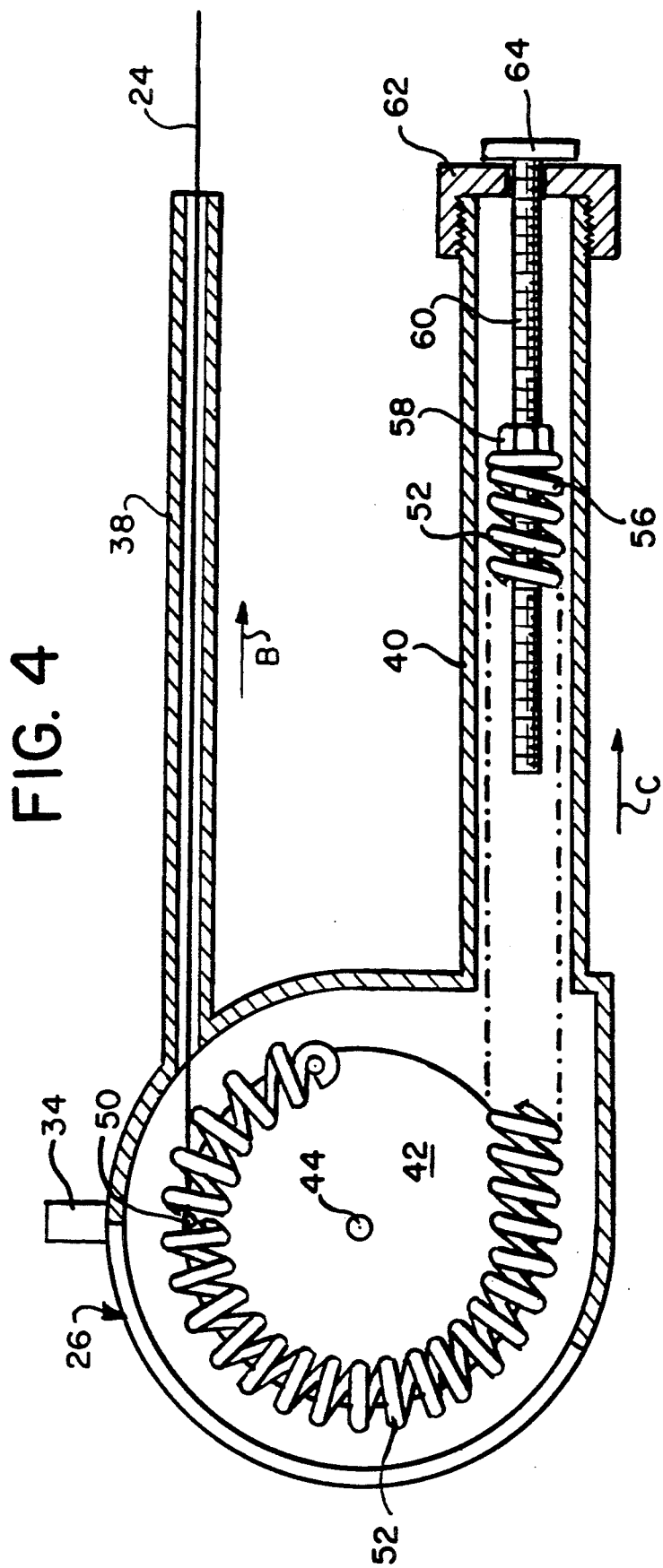

SHIFTING APPARATUS FOR MULTISPEED BICYCLES

BACKGROUND OF THE INVENTION

The present invention relates to multispeed bicycles having derailleurs and, in particular, to an apparatus for the cancellation and linearization of derailleur spring forces so that the effort necessary to shift such a bicycle is reduced.

Multiple speed bicycle transmissions are well known, providing a bicycle on either or both of its free wheel or chain driven wheel with one or more clusters of progressively sized gears coaxially arranged and a drive chain movable from one gear to another. Because each gear in the cluster is of a different size, the movement of the drive chain from one to another effectively changes the drive ratio of the bicycle. This movement of the drive chain is typically accomplished by a device known as a derailleur, which carries the chain from gear to gear.

The travel of the derailleur is controlled by a cable, the end of which is connected to a shift lever within reach of the rider. The derailleur has spring means which biases the derailleur position to a first end of the gear cluster. When the control cable is pulled by movement of the shift lever, the derailleur position travels away from the first end toward a second opposite end of the gear cluster, causing the load upon the bias spring to be increased, which in turn increases the tension in the shift cable.

As the derailleur is positioned further from the first end of its range of travel, increasingly greater effort must be applied to the shift lever to overcome the increasing load of the derailleur bias spring. This nonlinearity in the shift lever forces is undesirable.

In my copending Ser. No. 679,439, filed Apr. 2, 1991, a motorized electromechanical apparatus is disclosed for facilitating the shifting of the derailleur. The apparatus provides means for the force cancellation of the inherent tension in the shift cable to minimize the size, weight, and power requirements for effecting the gear change. While the apparatus disclosed in my aforementioned application is most satisfactory and highly useful, there are times when a motorized shift apparatus is not desirable and/or is not cost efficient, and a mechanical shift device will need to be used. If so, the problems of overcoming the high force of the derailleur biasing spring function forces and applied tension forces will remain.

It is the prime object of the present invention to provide a derailleur shift apparatus in which force cancellation is mechanically overcome in a simple and cost-efficient manner.

It is another object of the present invention to provide a system for reducing the nonlinearity of shift lever forces necessary to change gears of a multispeed bicycle.

It is also an object of the present invention to provide a device which improves the accuracy and speed with which gears can be mechanically shifted in a multispeed bicycle.

It is another object of the present invention to provide a device which achieves the aforementioned objects while being easily retrofitted to a conventional derailleur equipped multispeed bicycle.

Further objects and advantages of the instant invention will become apparent from the following disclosure.

SUMMARY OF THE INVENTION

According to the present invention, there is provided a shift apparatus for a cable operated bicycle derailleur system comprising a housing, a spool connected at its periphery to the cable of the derailleur system and journalled in said housing for rotation about its central axis, a shift lever connected to said spool for moving said spool into and out of selected rotative positions, an elongated spring entrained over the periphery of said spool and connected at one end to said spool and the other end to said housing, and spring means acting on said spool in a substantial equal and opposite manner to the force applied by the cable thereto.

Full details of the present invention are set forth in the following description and illustrated in the accompanying drawings.

BRIEF DESCRIPTION OF THE DRAWINGS

FIG. 2 is an enlarged view of the apparatus of the present invention, taken from the outboard side of FIG. 1;

FIG. 3 is a view partially sectioned of the apparatus of the present invention, taken from the inboard side of FIG. 1; and FIG. 4 is a view of the interior of the apparatus of the present invention, showing the force cancellation and linearization mechanism.

DETAILED DESCRIPTION OF THE INVENTION

Figure 1:
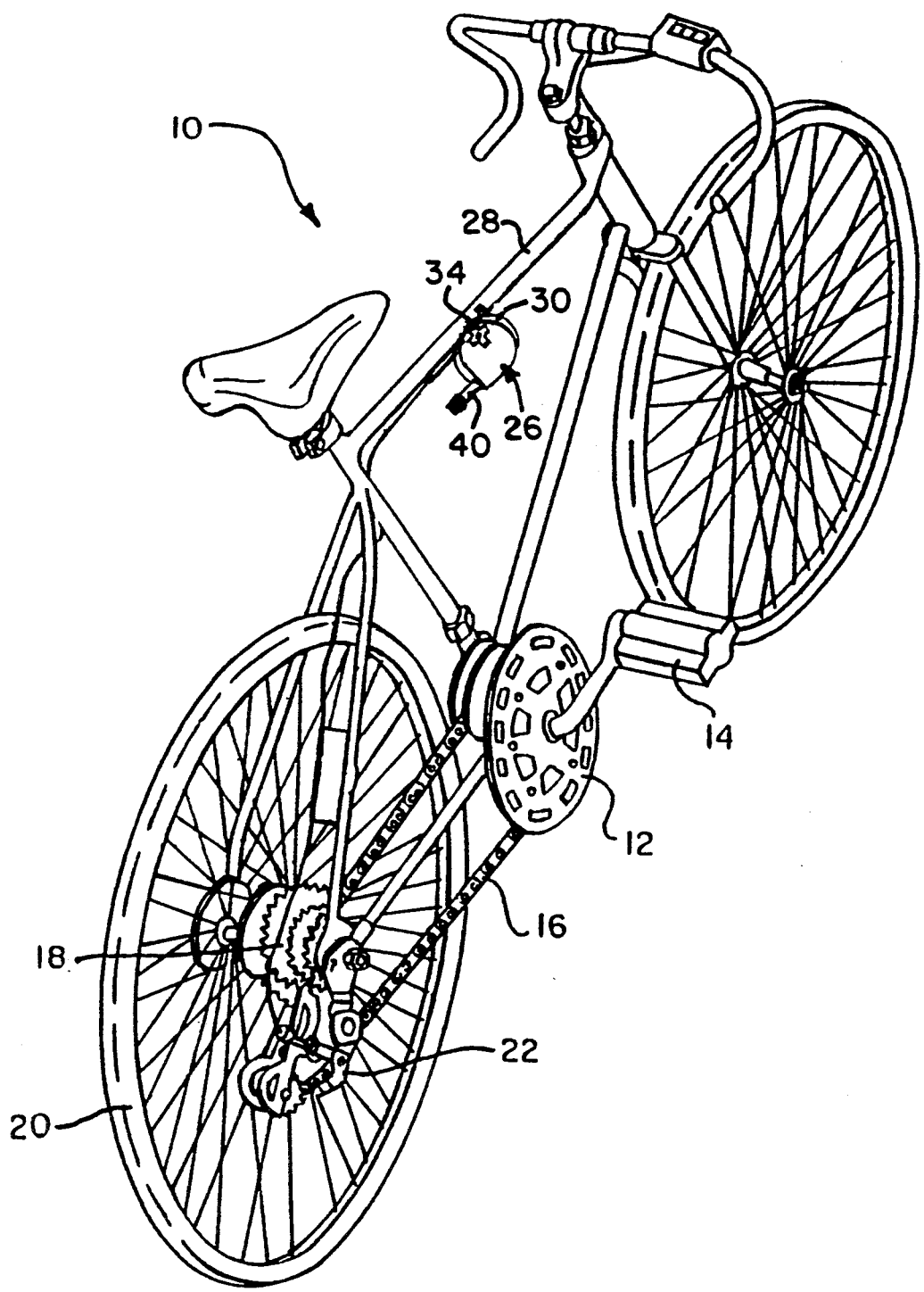
FIG. 1 is a perspective view of a multispeed bicycle provided with the apparatus embodying the present invention.

As seen in FIG. 1, the present invention is applied to a bicycle 10 having driving chainwheel 12 which is operated by a conventional pair of pedals 14 in bellcrank fashion. Engaged about chainwheel 12 is a drive chain 16, which in turn is wrapped around a driven gear cluster 18 mounted on the bicycle's free wheel 20 so that wheel and tire assembly is caused to rotate in a clockwise direction at a given speed dependent on the placement of the chain 16 of selected one of the gears in the cluster. Drive chain 16 passes simultaneously through a derailleur 22 commonly formed of a spring biased parallelogram arrangement of lever arms, over which the chain is guided from gear to gear by the gear cluster 18 in response to the application of a tensioning force on a control cable 24 such as a Boden cable. When the control cable 24 is pulled, the derailleur 22 moves the drive chain 16 laterally. Relaxation of tension on the control cable 24 reverses the lateral movement of the drive chain. Should further details of a derailleur be required, reference can be made to any of the prior mentioned patents or to other conventional derailleur systems.

The shift unit and force cancellation and linearization apparatus are located in a small housing 26 fixedly mounted on the cross bar 28 or other frame part of the bicycle so as to be conveniently accessible to the rider.

As seen more clearly in enlargement in FIG. 2, the housing 26 is a generally flat disk-like box having a removable cover 30 on one side for access therein and a bracket 32 for attachment to the cross bar 28. Rotatively journalled on the exterior on the side of the housing opposite the cover 30 is a cruxiform shaped lever 34, fixedly attached to an axle 36 extending into the housing so as to be conjointly rotatable clockwise and counterclockwise, as indicated by the double arrow A. The lever 34 is mounted at the upper portion of the housing near its peripheral edge.

Extending outwardly from the housing 26 at approximately the level of the lever 34 is a small tubular shield through which the derailleur cable 24 enters into the housing. Extending from the lower edge of the housing 26 is an elongated rigid sleeve 40 in which, as will be explained hereinafter, is located a portion of the force cancellation and linearization mechanism.

As seen in FIGS. 3 and 4, a spool 42 is mounted within the housing about a transversely oriented central axle 44 journalled in the side walls of the housing 26. The periphery of the spool 42 is formed with a continuous set of gear teeth 46 meshing with a pinion 48 fixedly mounted on the inner end of the lever axle 36. As a result, rotation of the lever 34 will be transmitted to the spool 42.

The end of the derailleur shift cable 24 entering the housing 26 is anchored to the spool 42 (See FIG. 4) at a point 50 on the periphery of the spool so that on rotation of the spool, the cable will wind thereabout.

Routed about the spool 42 is an elongated tension spring 52 having its innermost end 54 also anchored to the periphery of the spool 42 and its outer end 56 extending into the rigid sleeve 40. The outer end 56 of the spring 52 is held fast to the rigid sleeve 40 by a length adjusting mechanism consisting of a nut 58 welded to the end of the spring and an elongated screw 60 threaded into the nut and journalled in a cap 62 fixed onto the end of the rigid sleeve 40. The screw 60 is provided with head 64, which enables the length of the spring to be elongated or reduced to vary the tension exerted by the spring.

Viewing the apparatus as shown in FIG. 4, it will be appreciated that the cable 24 is biased under the pulling load in the direction of arrow B as a result of its connection to the derailleur placing a clockwise movment on the spool 42 (as seen in FIG. 4). The clockwise movement is balanced by a counterclockwise movement created by the bias of the tension spring 52 in the direction of arrow C.

The apparatus is initially arranged so that when the derailleur is set in the initial position i.e. with the chain 16 engaging the gear in the gear cluster 18 at the first end, the clockwise and counterclockwise movements are balanced and the arrangement is in normal stability. In this condition, it is preferable that the cable 24 and spring 52 extend from the spool 42 generally parallel to each other and generally tangentially to the periphery of the spool 42. In this condition, it will also be obvious that a line drawn between the two tangential points passes through the center 44 of the spool and provides a first class lever arrangement with the fulcrum between the two load ends. Thus, while a spool is preferred as providing more space for an elongated spring, other lever or rocker arrangements can be employed.

In operation, when the shift lever 34 is manipulated to change the gear position of the chain 16, the lever 34 is rotated, pulling or releasing the cable. Since the force application of the spring 52 is essentially linear, it will be effective in cancelling the bias of the derailleur spring. Further, because the spring 52 is wound around most of spool 14, while the extension sleeve 40 is annexed to housing 26, a spring 52 of great length may be used than cannot otherwise be accommodated in a limited housing alone. Obviously, numerous alternatives to tension spring 52 exist such as compression springs, torsion springs, and clock-type negator springs, which may be appropriately substituted to provide the necessary force to counteract the force of the bias spring of the derailleur 22 upon cable 18 without departing from the spirit or scope of the instant invention.

It is advantageous to have means for adjusting the preload of tension spring 52 for the fine tuning of cancellation forces and for the easy adaptation of the instant invention to bicycles having derailleur bias springs of differing forces. Alternative to the adjusting screw described, other adjustment means may be used such as a simple piece of threaded rod fastened securely to extension housing cap 36, allowing adjustment by twisting cap 36 instead of twisting the head of adjusting screw 34.

Since the force exerted on cable 18 by the bias spring of derailleur 22 is substantially neutralized by spring 26, the force necessary to turn lever 34 is virtually negligible, and as a consequence of this, it is not necessary to have a frictional mounting or stop mechanism for the lever to prevent its being moved by the force of the derailleur bias spring.

A ratio of 5 the shift lever 34 to 1 turn of the spool 42 is preferred while the anchor 50 of the cable is preferable at a radius selected so that approximately 270 degrees of rotation of shift lever 34 corresponds to the full travel of derailleur 22 through its range.

While the above description contains many specificities, these should not be construed as limitations on the scope of the instant invention but rather as an exemplification of the preferred embodiment thereof. Accordingly, the scope of the instant invention should not be determined by the embodiment shown but rather by the claims appended hereto and their legal equivalents.

What is claimed is:

1. An apparatus for shifting a multispeed bicycle or the like having a cable operated spring biased derailleur, comprising a housing; a circular spool rotatably mounted in said housing, the derailleur control cable being coupled to said spool so that when said spool is rotated, the derailleur position is changed; a force cancellation spring coupled to said spool so that force transmitted to s id spool by the derailleur bias spring through the derailleur control cable is substantially opposed and cancelled by said force cancellation spring.

2. The apparatus as set forth in claim 1, wherein said force cancellation spring is a tension spring and at least part of said force cancellation spring is wound substantially around said spool in a circular path.

3. The apparatus as set forth in claim 1, further comprising rider responsive means for adjusting the rotational position of said spool.

4. The apparatus as set forth in claim 3, wherein said housing further comprises a straight portion and said force cancellation spring extends from the circular path about said spool to a substantially linear path into said straight portion of said housing so that the length of said force cancellation spring cabable of being accommodated by said housing is increased.

5. The apparatus as set forth in claim 3, further comprising means for adjusting the preload of said force cancellation spring.

6. The apparatus as set forth in claim 5, wherein said force cancellation spring is elongated and has a first end coupled to said spool, and said preload adjustment means comprises a threaded nut connected to the second end of said force cancellation spring, and an elongated threaded rod rotatably mounted to said housing, said threaded rod operatively engaging said threaded nut so that turning said threaded rod changes the length and preload of said force cancellation spring.

7. The apparatus as set forth in claim 3, wherein said rider responsive means for adjusting the position of said spool comprises a shift knob located outside said housing and a shifting gear located inside said housing, said shifting gear being coupled to said shift knob for conjoint rotation therewith, and said spool is coupled for conjoint rotation to a gear in operative engagement with said shifting gear so that when said shift knob is selectively turned by the rider, said engaged gears cause said spool to rotate, changing the vehicle's drive ratio.

8. The apparatus of claim 7, mounted to a bicycle at a location within easy reach of the rider.

* * * * *